US010805262B1

(12) United States Patent
Fayfield et al.

(10) Patent No.: US 10,805,262 B1
(45) Date of Patent: Oct. 13, 2020

(54) MODBUS SYSTEM HAVING ACTUAL AND VIRTUAL SLAVE ADDRESSES AND SLAVE SENSORS

(71) Applicant: Banner Engineering Corp., Plymouth, MN (US)

(72) Inventors: Robert T. Fayfield, Ornono, MN (US); Mark Richard Rue, Plymouth, MN (US)

(73) Assignee: BANNER ENGINEERING CORP., Plymouth, MN (US)

( * ) Notice: Subject to any disclaimer, the term of this patent is extended or adjusted under 35 U.S.C. 154(b) by 0 days.

(21) Appl. No.: 16/436,672

(22) Filed: Jun. 10, 2019

(51) Int. Cl.
*G06F 15/16* (2006.01)
*H04L 29/12* (2006.01)
(Continued)

(52) U.S. Cl.
CPC ........ *H04L 61/2069* (2013.01); *H04L 12/403* (2013.01); *G05B 19/4185* (2013.01);
(Continued)

(58) Field of Classification Search
CPC .............. H04L 61/2069; H04L 12/403; H04L 2012/40228; H04L 2012/4026; G05B 19/4185; G05B 2219/36454
(Continued)

(56) References Cited

U.S. PATENT DOCUMENTS 7,231,467 B2 * 6/2007 Baker ................... G06F 13/423
710/110
7,694,050 B1 * 4/2010 Chan ................... G06F 13/4226
710/104
(Continued)

FOREIGN PATENT DOCUMENTS

WO     2014209368 A1     12/2014

OTHER PUBLICATIONS

Mvuilleu, A quick tutorial on RS485 and MODBUS, Internet of Things and Measures, Yoctopuce, Aug. 21, 2016, [online], [retrieved on Dec. 26, 2018]. Retrieved from the Internet <http://www.yoctopuce.com/EN/article/a-quick-tutorial-on-rs485-and-modbus>.
(Continued)

*Primary Examiner* — Melvin H Pollack
(74) *Attorney, Agent, or Firm* — Craige Thompson; Thompson Patent Law

(57) ABSTRACT

Apparatus and associated methods relate to a networked system having a master and multiple slaves, where each slave stores a unique (actual) slave address and a non-unique (virtual) slave address in memory, such that each slave is configured to respond to request messages addressed to the slave's non-unique slave address if a sensor device associated with the is in an active state when the slave receives the request message. In an illustrative example, the networked system may be a Fieldbus-style network (e.g., a network implementing the Modbus protocol). A sensor device may be a break-beam, capacitive touch, or push-button device, for example. An output indicator/actuator may be associated with a sensor device to indicate the status of the sensor device to a user. A networked system implementing sensor-activated response gating may beneficially expand the number of slave devices on the network while achieving low latency response times.

27 Claims, 11 Drawing Sheets

(51) Int. Cl.
*H04L 12/403* (2006.01)
*H04L 12/40* (2006.01)
*G05B 19/418* (2006.01)

(52) U.S. Cl.
CPC .............. *G05B 2219/36454* (2013.01); *H04L 2012/4026* (2013.01); *H04L 2012/40228* (2013.01)

(58) Field of Classification Search
USPC ...................................................... 709/208
See application file for complete search history.

(56) References Cited

U.S. PATENT DOCUMENTS

| | | | | |
|---|---|---|---|---|
| 7,788,431 | B2* | 8/2010 | Deshpande | G06F 13/4291 |
| | | | | 710/110 |
| 7,853,662 | B2* | 12/2010 | Ha | H04B 3/542 |
| | | | | 709/208 |
| 7,860,459 | B2* | 12/2010 | Jeong | H04W 84/20 |
| | | | | 455/41.2 |
| 8,806,654 | B2* | 8/2014 | Thanner | G06F 21/606 |
| | | | | 709/208 |
| 8,874,816 | B2* | 10/2014 | Tailliet | G06F 13/364 |
| | | | | 710/110 |
| 8,886,786 | B2* | 11/2014 | Hahniche | G05B 19/4184 |
| | | | | 700/79 |
| 8,923,286 | B2* | 12/2014 | Schmidt | H04L 12/403 |
| | | | | 370/389 |
| 9,021,044 | B2* | 4/2015 | Blustein | H04L 12/2818 |
| | | | | 340/656 |
| 9,112,642 | B2* | 8/2015 | Premke | H04L 12/403 |
| 9,312,974 | B2* | 4/2016 | Ando | H04J 3/0682 |
| 9,880,929 | B2* | 1/2018 | Roesch | H04L 9/0866 |
| 9,880,950 | B2* | 1/2018 | Sauer | G06F 13/16 |
| 10,009,874 | B2* | 6/2018 | Aki | H04L 12/403 |
| 10,355,917 | B2* | 7/2019 | Poisson | G06F 11/1625 |
| 10,514,683 | B2* | 12/2019 | Fisher | G05B 19/05 |
| 10,666,718 | B2* | 5/2020 | Wada | H04L 67/141 |
| 2003/0101282 | A1 | 5/2003 | White, III et al. | |
| 2010/0299401 | A1 | 11/2010 | Lloyd | |
| 2012/0271924 | A1 | 10/2012 | Spitaels et al. | |
| 2014/0336821 | A1* | 11/2014 | Blaine | H04L 41/046 |
| | | | | 700/275 |
| 2015/0074304 | A1* | 3/2015 | Adkins | G06F 13/4291 |
| | | | | 710/110 |
| 2016/0142370 | A1* | 5/2016 | Linder | H04L 61/6004 |
| | | | | 709/226 |
| 2018/0109398 | A1* | 4/2018 | Zotti | H04L 12/40202 |
| 2018/0249228 | A1* | 8/2018 | Yoshikawa | H04W 4/70 |
| 2018/0284710 | A1* | 10/2018 | Abe | G05B 19/048 |
| 2019/0036874 | A1* | 1/2019 | Sun | H04L 12/40123 |
| 2019/0068758 | A1* | 2/2019 | Lange | H04L 69/08 |
| 2019/0094412 | A1* | 3/2019 | Hardegger | G08B 13/186 |
| 2019/0098723 | A1* | 3/2019 | Sadwick | H05B 47/175 |
| 2019/0222407 | A1* | 7/2019 | Yoshida | H04L 12/403 |
| 2019/0235455 | A1* | 8/2019 | Michals | G05B 19/042 |
| 2020/0136852 | A1* | 4/2020 | Bleiker | H04L 12/2816 |
| 2020/0169945 | A1* | 5/2020 | Crouthamel | H04W 56/0015 |

OTHER PUBLICATIONS

Slave ID Shifting, tibbo.com, n.d., [online], [retrieved on Dec. 26, 2018]. Retrieved from the Internet <http://docs.tibbo.com/tmgm/slave-id-shifting.htm>.

Shenzhen 3onedata Technology Co., Ltd, GW110X series Modbus Gateway User Manual, 3onedata, Version 1.0.1, Nov. 2015, [online], [retrieved on Dec. 26, 2018]. Retrieved from the Internet <https://consteel-electronics.com/system/download/gw110x-series-software-usermanual.pdf.723b25275bec32b9a1c2405b44dd37bb>.

Moxa Technologies Co., Ltd., MGate MB3000 Modbus Gateway User's Manual, moxa.com, Second Edition, Aug. 2007, [online], [retrieved on Dec. 26, 2018]. Retrieved from the Internet <http://support.elmark.com.pl/moxa/products/Filedbus_gateway/MGate_MB3x80/manual/MGate_MB3000_Series_Users_Manual_v2.pdf>.

Banner, EZ-Light K50 Modbus Series Pick-to-Light Sensors, datasheet, Mar. 14, 2016, [online], [retrieved on Dec. 26, 2018]. Retrieved from the Internet <https://smartfactory.ie/wp-content/uploads/2016/01/banner-50mm-K50-MODBUS-SERIES-PICK-TO-LIGHT-SENSORS-datasheet.pdf>.

SFRSS-A2-485 Remote Sensor Module Instruction Sheet, SignalFire Telemetry, Rev 1.0, May 8, 2013, [online], [retrieved on Dec. 26, 2018]. Retrieved from the Internet <https://www.signal-fire.com/wp-content/uploads/2017108/960-0044-01-SignalFire-A2-485-Sensor-Interface-System-Manual-Rev-1_0.pdf>.

GE, WorkstationST Modbus® Feature Instruction Guide, GEI-00696E, Jul. 2014, [online], [retrieved on Dec. 26, 2018]. Retrieved from the Internet <https://digitalsupport.ge.com/servlet/fileField?id=0BE1A0000008bfE>.

PVA Series, Compact Part Verification Array, Banner, n.d., [online], [retrieved on Feb. 11, 2019]. Retrieved from the Internet <https://www.bannerengineering.com/us/en/products/sensors/slot-sensors-and-part-sensing-arrays/part-verification-array-pva-series.html?sort-4#all>.

U-GAGE® T30UX Series with Analog Output, Datasheet, Banner, Sep. 19, 2016, [online], [retrieved on Feb. 11, 2019]. Retrieved from the Internet <http://info.bannerengineering.com/cs/groups/public/documents/literature/141958.pdf>.

* cited by examiner

MODBUS SYSTEM HAVING ACTUAL AND VIRTUAL SLAVE ADDRESSES AND SLAVE SENSORS

TECHNICAL FIELD

Various embodiments relate generally to computer networks, and more specifically, to use of Fieldbus-type networks implementing a master-slave network model.

BACKGROUND

Computers and other electronic devices may be interconnected to one another via a computer network. Computer networks may have different forms and varieties of topologies. For example, a network may be arranged in a ring, mesh, star, tree, or bus configuration. Some computer networks may be wired (e.g., using a coaxial cable and/or twisted pair cabling), or may be wireless (e.g., using radio signals using different modulation schemes). Types of networks may also include local area networks (LANs), wide area networks (WANs), and controller area networks (CANs).

Fieldbus is a family of industrial computer network protocols used for real-time distributed control, standardized as IEC 61158. There are a variety of different Fieldbus standards, one among them being the Modbus communications protocol for connecting industrial electronic devices. A Modbus system is arranged with a master device networked with multiple slave devices. A Modbus system may process request/response messages sent from a master to a slave, or from a slave to a master. For example, a Modbus message may correspond to operations to read and write 16-bit words and binary registers of a specifically-addressed slave.

A Modbus message may include multiple parts. For example, function code and data may represent a Modbus Protocol Data Unit (PDU). An address field and cyclic redundancy check (CRC) may, along with the function code and data, represent a Modbus Application Data Unit (APU). Under the Modbus protocol, each slave is assigned a unique slave address/ID (e.g., 1-247). A Modbus request message may start with the slave address/ID of the intended recipient slave, and a response may start with the slave address/ID of the slave sending the response. In unicast mode, a Modbus transaction may consist of two messages: a request from the master, and a reply from the slave. For example, the master may send a request message addressed to an individual slave having a specific, unique slave address/ID, and after receiving and processing the request, the individual slave may return a response message to the master. In broadcast mode, the master sends a request to all slaves, and no response is returned to broadcast requests sent by the master. The broadcast requests may be writing commands (as opposed to read commands), where all slaves may be required to accept the broadcast for writing function. The address of "0" is typically reserved to identify a broadcast exchange.

SUMMARY

Apparatus and associated methods relate to a networked system having a master and multiple slaves, where each slave stores a unique (actual) slave address and a non-unique (virtual) slave address in memory, such that each slave is configured to respond to request messages addressed to the slave's non-unique slave address if a sensor device associated with the slave is in an active state when the slave receives the request message. In an illustrative example, the networked system may be a Fieldbus-style network (e.g., a network implementing the Modbus protocol). A sensor device may be a break-beam, capacitive touch, or push-button device, for example. An output indicator/actuator may be associated with a sensor device to indicate the status of the sensor device to a user. A networked system implementing sensor-activated response gating may beneficially expand the number of slave devices on the network while achieving low latency response times.

Various embodiments may achieve one or more advantages. For example, some embodiments may allow for highly responsive and reliable sensor operation for large networked systems deployed in a distribution warehouse or industrial control environment. Some embodiments may adapt Modbus-enabled devices to be deployed using a modified addressing scheme to achieve low-latency response times. In some examples, actuators may provide users with a (visual) indication of whether a slave-connected sensor has been activated. A master device may be configured, for example, to handle slave timeouts in Modbus networks employing a large number of slave devices (e.g., 200-500). Slave devices may be configured, for example, to respond with a predetermined delay after receiving a request message, which may mitigate and/or avoid address collisions on a Modbus network.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Standard Modbus slave devices may be addressed using a user defined identifier (ID). This is the typical communication addressing method of a master controller talking with an (end) slave device using Modbus. A Modbus master transmitting a write message to ID 0 may represent a broadcast message. A broadcast message may be typically accepted by all devices on the network, and no responses may be expected by the master. By adding another non-unique ID to the memory of each of the slave devices, the slave devices may respond to another (virtual) address that can be made to be common among select slave devices in the system. For example, if an end device has an ID of 5 and a virtual ID of 195 the device will response to messages addressing ID 5 and ID 195. However, slave devices may only respond to a virtual ID if the sensor input associated with that particular slave device is activated. So, for example, when the Modbus master in the system is looking for a sensor activation somewhere in the network, it only needs to poll the virtual ID address (as opposed to individually polling across actual/unique addresses/IDs). Accordingly, in various examples, when a specific sensor input is activated, the slave associated with that specific sensor input may respond to a master request using the virtual ID address, sending back data that identifies the Modbus ID (fixed address) and the sensor state. In the case of multiple sensors activated in the system, or the wrong sensor activation, multiple devices may cause a bus collision that will be corrected when the sensor timeout is reached. By configuring slave devices to respond in this way, the master device may be operational to send read requests using a smaller number of virtual IDs (as opposed to every actual Modbus ID in the system).

Figure 1:
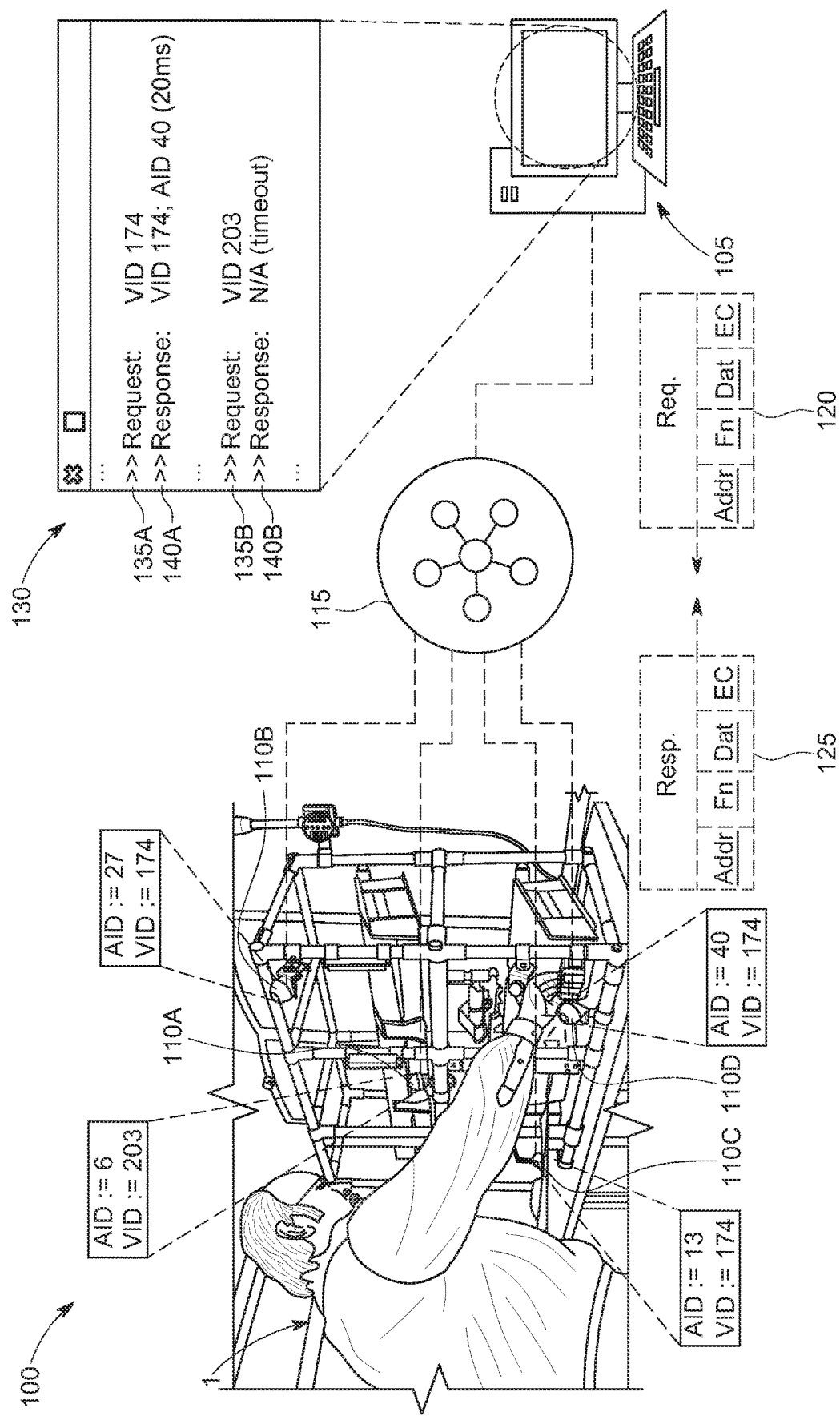
FIG. 1 depicts a scenario illustrating an exemplary network having a master device and multiple slave devices each associated with a respective input sensor and output actuator.

FIG. 1 depicts a scenario illustrating an exemplary network having a master device and multiple slave devices each associated with a respective input sensor and output actuator. An exemplary use-case scenario 100 includes a master device 105. The master device 105 may be a desktop or laptop computer, for example. The master 105 may include processor-executable instructions stored in memory that enable it to act as a master in a Fieldbus network, such as a network implementing the Modbus protocol, for example.

The master device is operably coupled to a plurality of slave devices 110A, 110B, 110C, and 110D (referred to collectively herein as "slaves 110") over a network 115. The network 115 may be configured as a Modbus network with RS-485 cabling, for example. In this exemplary depiction, the network 115 is a star network, although other network topologies are possible. In some examples, the network 115 may be a wireless network configured to transmit data between the master 105 and the slaves 110. The slaves 110 may include processor-executable instructions stored in memory that enable them to act as a slave in a Fieldbus network, such as a network implementing the Modbus protocol, for example.

In the depicted scenario, the master 105 transmits a request message 120 over the network 115. In response, one of the slaves 110 may transmit a response message 125. Different request messages 120 and response messages 125 (that were received at the master 105) may be represented in a graphical user interface (GUI) of the master 105, for example. In a first example, the master 105 transmits a request 135A addressed to any slave devices 110 having a virtual/non-unique ID (VID) of 174. The request 135A will be transmitted to each one of the slaves 110 from the master 105. The request 135A may, for example, be electronically transmitted bits representing a Protocol Data Unit (PDU) transmitted through the (Modbus) network 115. The PDU of the request 135A may include: (1) a destination address, (2) function code, (3) data, and (4) error check, in accordance with Modbus protocol specification.

In response to receiving the request message 120, each slave 110 may read the request message 120 and determine whether to transmit a response message 125 back to the master 105. A given slave 110 may determine whether to respond to the request 120 depending on two conditions. The first condition is whether the request message 120 is addressed to the specific virtual/non-unique address stored in memory of the given slave 110. The second condition is whether an associated sensor input of the given slave 110 is activated when the given slave 110 receives the request message 120.

In the exemplary depiction of FIG. 1, each sensor input is integrated with an indicator/actuator output in the form of individual light-up capacitive touch buttons. The capacitive touch button may, for example, have a light emitting diode (LED) as an actuator output, with a capacitive sensing surface as the sensor input. When a sensor input is activated, its corresponding actuator output is actuated to indicate the active state of the sensor input to a user 1.

As shown in FIG. 1, each slave 110A-110D receives the request message 120 addressed to VID 174 (as indicated by the request 135A) over the network 115. Slave 110A reads the request 135A and determines whether the virtual/non-unique address contained in the request 135A matches the virtual/non-unique address stored in memory of slave 110A. In this scenario, an actual ID (AID) of 6, and a virtual/non-unique ID (VID) of 203 is stored in the memory of the slave 110A. The request 135A is addressed to VID 174, therefore the two virtual addresses do not match. Accordingly, the internal logic of the slave 110A determines that the request 135A is not destined for the slave 110A, and so does not respond to the request 135A.

Slave 110B has an AID of 27 and a VID of 174. Therefore, the virtual/non-unique address stored in memory of slave 110B matches the destination address in request 135A (174=174). However, the sensor input of the slave 110B is not currently activated, as indicated by the output indicator (e.g., an LED) being in the off state. Accordingly, the internal logic of slave 110B determines that the slave will not respond to the request 135A, because the sensor input of slave 110B is not activated when the request message was received at the slave 110B. Note that a similar situation also applies to slave 110C since the sensor input of slave is also not activated when slave 110C receives the request 135A (as indicated by the light-up capacitive touch button 111C being in a dark or unlit state).

Slave 110D has an AID of 40 and a VID of 174. Therefore, the VID stored in memory of slave 110D matches the VID 174 in the request 135A. In addition, slave 110D receives the request 135A while the sensor input of the slave 110D is activated (as indicated by the illuminated output actuator of the light-up capacitive touch button associated with slave 110D). Therefore, the internal logic of slave 110D determines that, because the VIDs are a match and the sensor input is activated, slave 110D will respond to the request 135A by transmitting a response message 140A. Accordingly, the master 105 will receive from slave 110D the response 140A associated with the request 135A.

In a second example, a request 135B is sent from the master 105. The request 135B is addressed to all slaves 110 that have a VID of 203. In this scenario, there is only one slave 110 that has a VID of 203—slave 110A. However, because the sensor input of the slave 110A is not currently activated (as indicated by the (visual) output indicator being in the off state), the slave 110A will not respond to the request 135B. And since none of the other slaves 110B-110D have VID's that match the VID in request 135B, the master 105 receives no response from any slave. Therefore, after a predetermined amount of time, the master 105 may make a determination of no response 140B (e.g., a timeout).

In an illustrative embodiment, the networked system depicted in FIG. 1 may be deployed in a distribution warehouse. The distribution warehouse may be for delivering items/goods to customers that the customers ordered using an online e-commerce website (such as those sites operated by Alibaba Group Holding Limited or Amazon.com Inc.). A user 1 at the warehouse may be filling an e-commerce order for a specific consumer. The user 1 may retrieve a specific item/good from one of multiple item bins. For example, a consumer might have ordered headphones through an e-commerce website, and the user 1 may be tasked with retrieving the headphones from the right bin. When the user 1 retrieves an item from a bin, the user 1 may activate the sensor input of the slave 110 associated with that bin. In the depicted example, the user 1 is retrieving an item from the bin having an associated slave 110D and light-up capacitive touch button. When the user 1 retrieves the item from the bin associated with slave 110D, the user may activate the button, which may cause the button to illuminate, thus indicating to the user that button is activated. On the back end, the master 105 may regularly ping specific slave devices (based on their virtual/non-unique ID) to determine which of these slave devices have a sensor input in an active state. In this sense, the master 105 may beneficially keep track of which items are retrieved from which bins, by receiving response messages only from slaves 110 with activated sensor inputs.

As the number of slave devices 110 increase, a traditional Modbus system based on unicasting messages addressed to the actual IDs (AIDs) of each individual slave 110 may experience latency issues that negatively affect the response time of slaves 110. However, by implementing response conditions based on (1) matching virtual/non-unique IDs, and (2) whether an associated sensor input is active, the networked system disclosed herein may advantageously expand the number of slaves 110, while maintaining a low latency response time that is desirable in a distribution warehouse setting. In this sense, the master 105, slaves 110, and network 115 may achieve impressive performance results that are not attainable using traditional Fieldbus/Modbus architectures.

Figure 2:
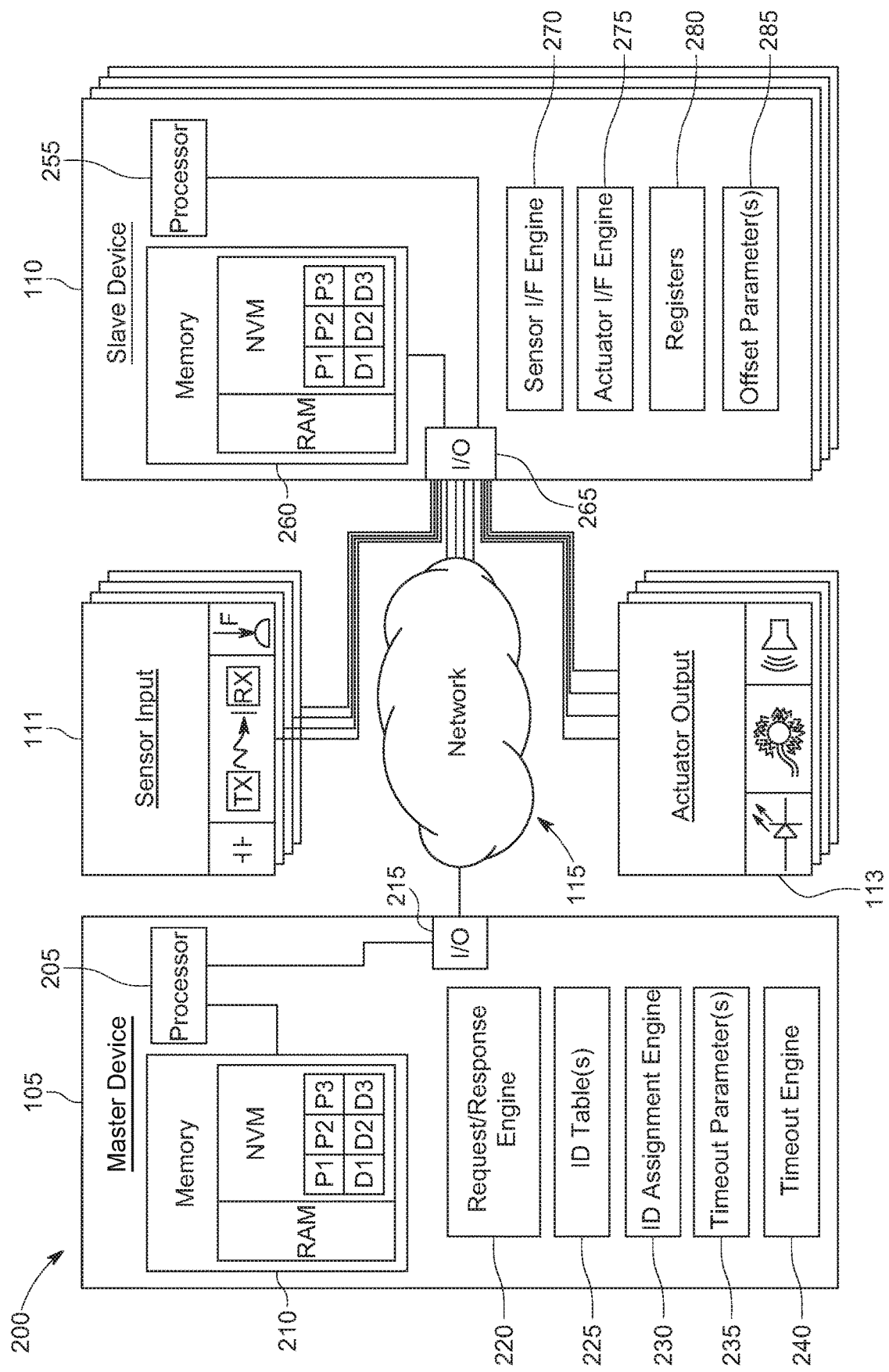
FIG. 2 depicts a diagrammatic view of an exemplary network having a master device connected to multiple slave devices over a network, each of the slave devices being operably coupled to a corresponding sensor device.

FIG. 2 depicts a diagrammatic view of an exemplary network having a master device connected to multiple slave devices over a network, each of the slave devices being operably coupled to a corresponding sensor device. A networked system 200 includes a master device 105 connected to multiple slave devices 110 over a network 115. Each slave device 110 is operably coupled to a respective sensor input 111 and respective actuator output 113.

The master 105 includes a processor 205. The processor 205 is operably coupled to memory 210, which may include volatile/random access memory (RAM), and non-volatile memory (NVM). The NVM of memory 210 may store program instructions and/or data, which may be executed by the processor 205. The processor is also operably coupled to input/output (I/O) 215. In some examples, I/O 265 may include a wired or wireless interface that facilitates communication from the master 105 to the network 115. In various implementations, the network may be a Fieldbus-style network, such as a network that implements the Modbus protocol.

The master 105 includes a request/response engine 220. The request/response engine 220 may be program instructions stored in memory 210 that handles transmitting/receiving requests and transmitting/receiving responses to/from slaves 110. The master 105 includes at least one ID table 225. The ID table 225 may be data stored in memory 210 that may contain mappings between AIDs and VIDs for the slaves 110 that serve the master 105, for example. The master 105 includes at least one timeout parameter 235 that may also be stored in memory 210. The master 105 includes an ID assignment engine 230 that may be program instructions stored in memory 210. The ID assignment engine 230 may include operations to properly configure the virtual/non-unique IDs for each slave 110 in the networked system 200. The timeout parameter 235 may be a predetermined numerical value that governs how long the master 105 will wait after sending a request message without a response before assuming a timeout has occurred. The master includes a timeout engine 230 that may be program instructions stored in memory 210. The timeout engine 230 may include operations that governs how the master 105 handles timeouts based at least partially on the stored timeout parameter 235.

Each slave device 110 includes a processor 255. The processor 255 is operably coupled to memory 260, which may include volatile/random access memory (RAM), and non-volatile memory (NVM). The NVM of memory 260 may store program instructions and/or data, which may be executed/used by the processor 255. The processor is also operably coupled to input/output (I/O) 265. In some examples, I/O 265 may include a wired or wireless interface that facilitates communication from the slave 110 to the network 115.

Each slave 110 includes a sensor interface engine 270. The sensor interface engine 270 may be program instructions and/or data stored in memory 260 for interfacing with an associated sensor input 111. For example, the sensor interface engine 270 may include signal conditioning electronics and/or an analog-to-digital converter (ADC) for reading electrical sensor signals transmitted from the sensor input 111. The slave 110 also includes an actuator interface engine 275. The actuator interface engine 275 may be program instructions and/or data stored in memory 260 for interfacing with an associated actuator output 113. For example, the actuator interface engine 275 may include signal conditioning electronics and/or a digital-to-analog converter (DAC) for transmitting electrical actuation signals to the associated actuator output 113. The slave 110 may include multiple registers 280, which may be data stored in memory 260. For example, a given slave may have a 16-bit input register and a 16-bit holding register. The slave 110 may include at least one offset parameter 285, which may be data stored in memory 260. The offset parameter 285 may be a predetermined numeric value stored in memory 260 that dictates how long a given slave 110 delays its response after receiving a matching message from the master 105. By configuring different slaves 110 with different offset parameters, collisions on the network 115 may be substantially mitigated/avoided.

Each slave 110 is operably coupled (e.g., via electrical wiring) to a respective sensor input 111. Each sensor input 111 may take a variety of forms. For example, a sensor input 111 may be a capacitive touch input, a break beam sensor input, or a push button input. When the sensor input 111 is activated by a user, the sensor input 111 may transmit an activation signal to its associated slave 110. The slave 110 may store an indication of the activated sensor input 111 as data in memory (e.g., as a bit, where 0 represents a non-activated state, and 1 represents an activated state). In this sense, a given slave 110 may be "aware" of the state of its associated sensor input 111, and may perform (conditional) operations based on the state of the associated sensor input 111.

Each slave 110 is operably coupled (e.g., via electrical wiring) to a respective actuator output 113. Each actuator output 113 may take a variety of forms. For example, an actuator output 113 may be an optical illuminator output (such as an LED), a haptic feedback output, or a audible output. When input is given to the sensor input 111 (e.g., it is activated by a user), its associated actuator output 113 may be actuated to reflect the real-time state of the given sensor input 111. For example, and with respect to the exemplary depiction of FIG. 1, a user may tap the sensor input 111 (a capacitive touch surface) using the user's finger. Upon detecting this touch, the sensor input 111 may transmit a message to its associated actuator output (e.g., via an associated slave 110), which may cause the actuator output to light up (in the case the actuator output is an LED or other light emitting device). Accordingly, the actuator output 113 may provide feedback (e.g., visual, tactile, auditory) to a user that indicates to the user a current/real-time state of the sensor input 111 associated with the actuator output.

Figure 3:
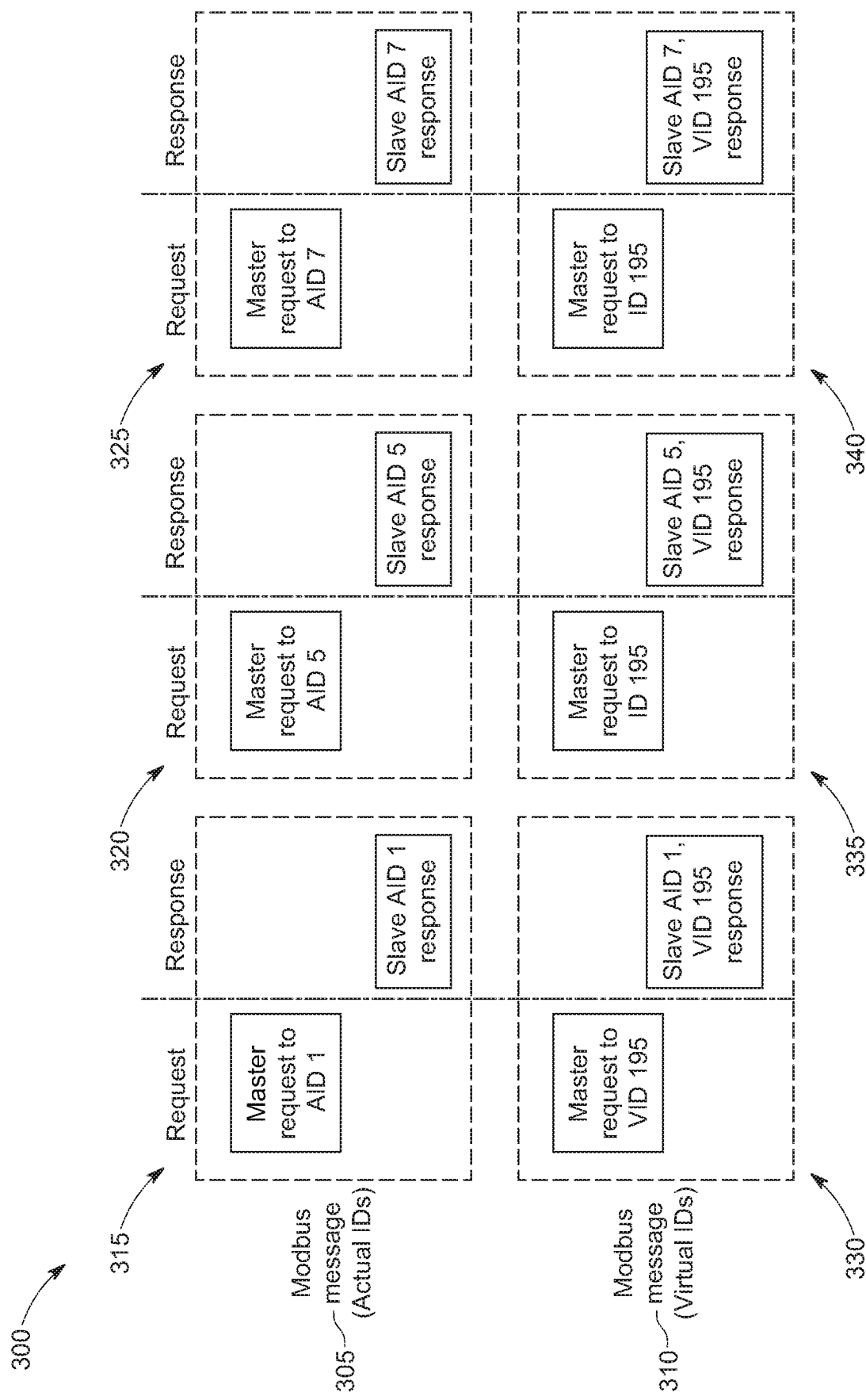
FIG. 3 depicts exemplary requests and responses in a network implementing unique (actual) and non-unique (virtual) addressing for slave devices.

FIG. 3 depicts exemplary requests and responses in a network implementing unique (actual) and non-unique (virtual) addressing for slave devices. A collection of request and response message scenarios 300 are shown as functional blocks. A first set of messages 305 are Modbus messages addressed to a specific slave using actual/unique IDs (AIDs). A second set of messages 310 are Modbus messages addressed to specific slaves using virtual/non-unique IDs (VIDs). In this exemplary illustration, there are three slave devices all having the same VID 195, but with different AIDs (e.g., 1, 5, and 7).

A first request/response message pair 315 includes a master request message addressed to a slave having a unique AID of 1. The first request/response message pair 315 includes a slave response from the slave having the AID of 1. Similar scenarios occur for second and third request/response message pairs 320, 325. For pair 320, the master sends a request addressed to AID 5, and the slave with assigned AID 5 responds. For pair 325, the master sends a request addressed to AID 7, and the slave with assigned AID 7 responds. The pairs 315-325 may be conventional Modbus request/response messages that behave according to the unique slave ID addressing scheme detailed in the Modbus Protocol Specification.

For the second set of messages 310, the master device transmits a request message addressed to any slave devices having a specific non-unique VID. For example, a fourth request/response message pair 330 includes a master request message addressed to slaves having assigned VIDs of 195. When the request of pair 330 is received at each slave, the sensor input of slave having AID:=1 is activated, while the sensor inputs of the slaves with AID:=5 and AID:=7 are not activated. Therefore, only the slave with AID:=1 and VID:=195 responds, because (1) the VID in the request message matches the VID in the slave (195==195), and (2) this slave (having AID:=1) has its sensor input in the active state when the request message is received at the slave.

A fifth request/response message pair 335 includes a master request message addressed to slaves having assigned VIDs of 195. When the request of pair 335 is received at each slave, the sensor input of slave having AID:=5 is activated, while the sensor inputs of the slaves with AID:=1 and AID:=7 are not activated. Therefore, only the slave with AID:=5 and VID:=195 responds, because (1) the VID in the request message matches the VID in the slave (195==195), and (2) this slave (having AID:=5) has its sensor input in the active state when the request message is received at the slave.

A sixth request/response message pair 340 includes a master request message addressed to slaves having assigned VIDs of 195. When the request of pair 340 is received at each slave, the sensor input of slave having AID:=7 is activated, while the sensor inputs of the slaves with AID:=1 and AID:=5 are not activated. Therefore, only the slave with AID:=7 and VID:=195 responds, because (1) the VID in the request message matches the VID in the slave (195==195), and (2) this slave (having AID:=7) has its sensor input in the active state when the request message is received at the slave.

Therefore, under most operating conditions, Modbus messages addressed to multiple slaves all having the same VID may result in only a single response message being transmitted back to the master. Only a single response message may be transmitted because it is incredibly unlikely (from a probability of statistical standpoint) that two slave devices with the same VID will have their respective sensor inputs activated at the same exact time. Accordingly, a networked system implementing virtual/non-unique addressed in slave devices may still be able to run under a standard Modbus protocol, while being adapted to handle a large volume of slave devices at relatively low latency.

Figure 4:
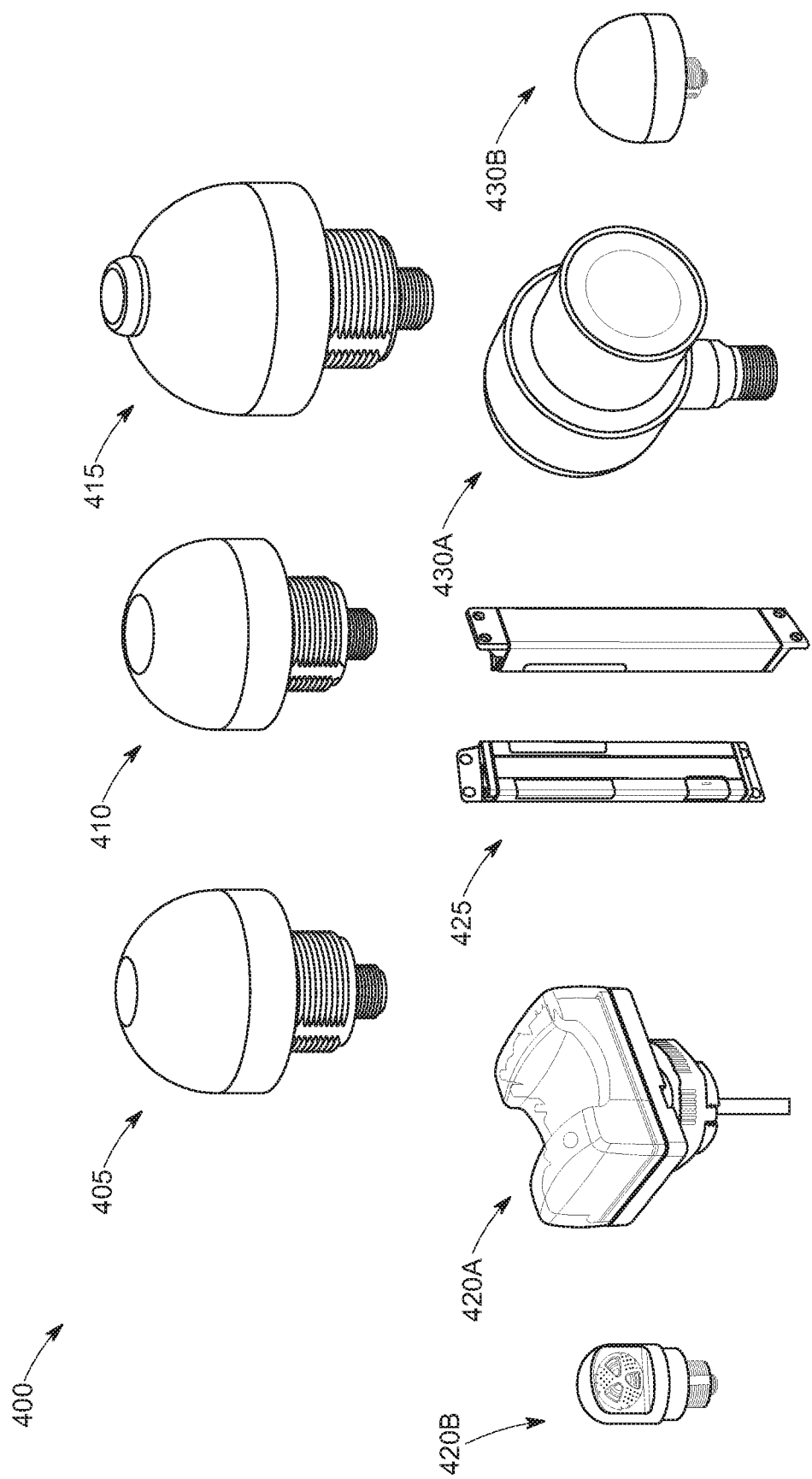
FIG. 4 depicts multiple perspective views of exemplary sensors and actuators for use in a network implementing unique (actual) and non-unique (virtual) addressing for slave devices.

FIG. 4 depicts multiple perspective views of exemplary sensors and actuators for use in a network implementing unique (actual) and non-unique (virtual) addressing for slave devices. Several sensor/actuator devices 400 are depicted, each having different configurations. Some of the devices 400 may be used as a combined/integrated sensor input and actuator output (e.g., devices 405, 410, 415, and 425) deployed in a networked system (such as the system 200 shown in FIG. 2). In various examples, the sensor and actuator for a given slave may be separate units that operably couple together (e.g., devices 420A/420B and 430A/430B). A networked system may employ different types of sensors and/or actuators for each slave device, in some embodiments.

A first sensor/actuator device 405 is a light-up, fixed field, polarized retroreflective device. Examples of light-up, fixed field, polarized retroreflective devices may include the K50 Modbus Series Illuminated Pick-to-Light Optical Buttons (Model No. K50LPGRYS1Q) manufactured by Banner Engineering Corp. headquartered in Plymouth, Minn. The first sensor/actuator device 405 may include a sensor that operates in a polarized retroreflective sensing mode. The first sensor/actuator device 405 may include an actuator (such as an LED) that may output a visual indication of the real-time state of the sensor.

A second sensor/actuator device 410 is a light-up, capacitive touch device. Examples of light-up, capacitive touch devices may include the K50 Modbus Series Illuminated Pick-to-Light Capacitive Touch Buttons (Model No. K50TGRYS1Q) manufactured by Banner Engineering Corp. The second sensor/actuator device 410 may include a sensor having a capacitive touch surface/interface configured to measure the touch of a user's finger, for example. The first sensor/actuator device 405 may include an actuator (such as an LED) that may output a visual indication of the real-time state of the sensor.

A third sensor/actuator device 415 is a light-up, push button device. Examples of light-up, push button devices may include the K50 Modbus Series Illuminated Pick-to-Light Push Buttons (Model No. K50PBGRYS1Q) manufactured by Banner Engineering Corp. The third sensor/actuator device 415 may include a sensor having a (mechanical) push button interface. The third sensor/actuator device 415 may include an actuator (such as an LED) that may output a visual indication of the real-time state of the sensor.

A fourth sensor device 420A is an optical touch button device. Examples of optical touch button devices may include the OTB Series Optical Touch Buttons (Model No. OTBVN6) manufactured by Banner Engineering Corp. The fourth sensor/actuator device 420A may include a sensor having an optical interface (e.g., with an optical transmitter and receiver to detect the presence of a user's finger). The fourth sensor device 420A may be operably coupled to an actuator device 420B that may output an audible indication of the real-time state of the sensor. Examples of audible actuators 420B may include the TL50A Audible Indicators (Model No. TL50AQ) manufactured by Banner Engineering Corp.

A fifth sensor/actuator device 425 is a light-up, optical break beam device. Examples of light-up, optical break beam devices may include the PVA Series Pick-to-Light Array (Model No. PVA100N6) manufactured by Banner Engineering Corp. The fifth sensor/actuator device 420 may include a sensor having an optical break beam interface (e.g., with an optical transmitter and receiver to detect the presence of a user's hand or arm). The fifth sensor/actuator device 425 may include an actuator (such as an LED) that may output a visual indication of the real-time state of the sensor.

A sixth sensor device 430A is an ultrasonic sensor device. Examples of ultrasonic sensor devices may include the U-GAGE® T30UA Series Ultrasonic Sensor (Model No. T30UXUA) manufactured by Banner Engineering Corp. The sixth sensor device 430A may include a sensor having an acoustic emitter and receiver to detect the presence of a user's hand or arm in the vicinity of the sixth sensor device 430A. The sixth sensor device 430A may be operably coupled to an actuator device 430B that may output a visual indication of the real-time state of the sensor. Examples of visual actuators 430B may include the EZ-LIGHT® K70 Wireless Indicator Light (Model No. K70DXN9RQ) manufactured by Banner Engineering Corp.

Figure 5:
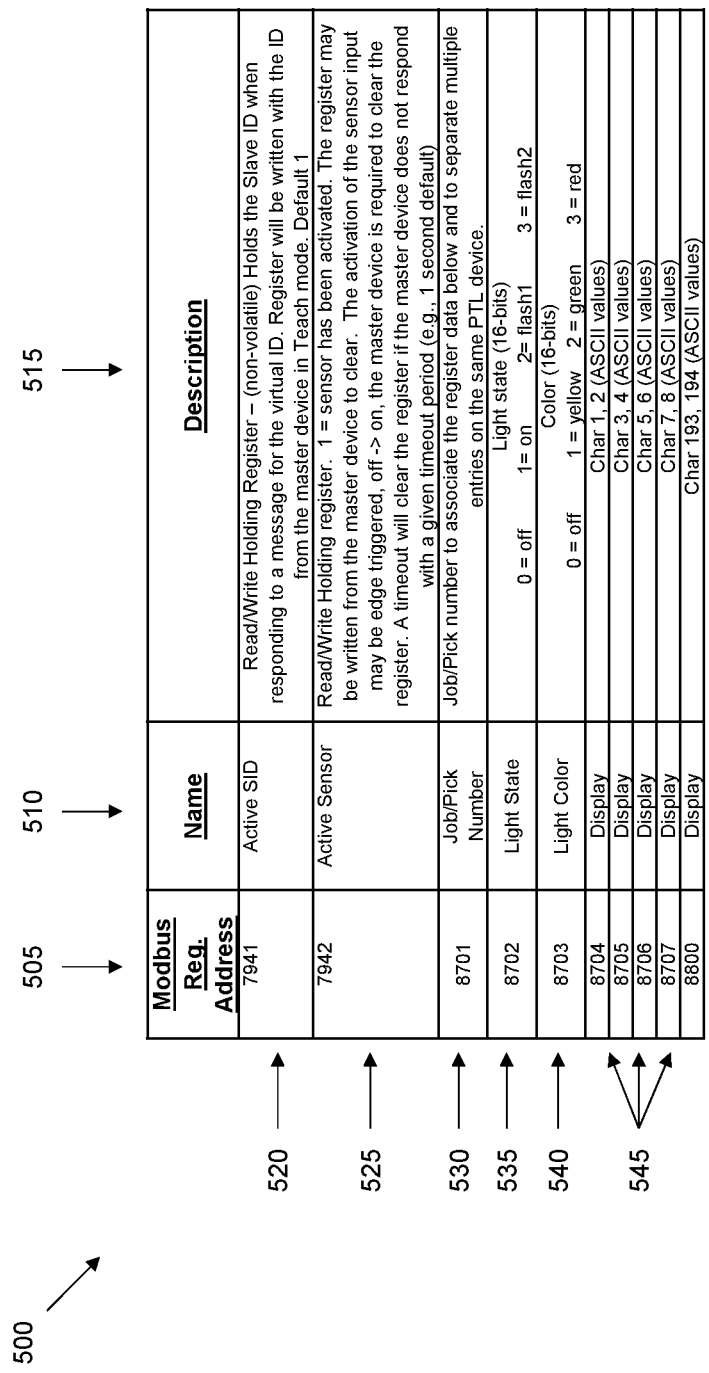
FIG. 5 depicts a table of exemplary Modbus register addresses and associated names and descriptions.

FIG. 5 depicts a table of exemplary Modbus register addresses and associated names and descriptions. An exemplary register assignment table 500 includes a Modbus register address column 505, a name column 510, and a description column 515. Various registers in each Modbus slave device may be configured in accordance with the information shown in the table 500.

A first row 520 of the table 500 indicates that a first register 7941 may be associated with the name "Active SID." The description field of the first row 520, details that register 7941 may be a read/write holding register in non-volatile memory (NVM). Register 7941 also stores a slave address/ID that represents a virtual/non-unique address/ID (VID) for an associated slave device. The address assignment operations for assigning/writing a VID to register 7941 may be at least partially performed in cooperation with the master device. For example, the master device may send a message to a slave commanding the slave to enter a "teach mode" to assign/write a VID to register 7941. An exemplary teach mode process is detailed in FIG. 6 and explained in detail further below. The default assignment value for register 7941 may be 1, in some examples.

A second row 525 of the table 500 indicates that a second register 7942 is associated with the name "Active Sensor." The description field of the second row 530 details that register 7942 may be a read/write holding register in memory (perhaps volatile memory or RAM). A value of 1 stored in register 7942 may indicate that an associated sensor has been activated. In some examples, the register may be written from the master device to clear. In various embodiments, activation of the sensor input may be edge triggered (off state to on state). In some implementations, a sensor timeout parameter stored in the slave's memory may clear register 7942 if the master device does not respond with a given timeout period (with 1 second as a default value, in some embodiments). For example, whenever the sensor is activated, a timer may start, and if the master does not transmit a message to the slave 1 second after the register 7942 transitions from 0 to 1, the timer may expire and register 7942 may be wiped.

A third row 530 of the table 500 indicates that a third register 8701 is associated with the name "Job/Pick Number." The description field of the third row 525 details that register 8701 may be used when multiple tasks/indications are requested from the same slave device. For example, the Job/Pick number may used to stamp a pick-to-light (PTL) message (e.g. turn on light green, display 12345) to a specific job and pick item. Such an implementation may require the slave device to implement a queue mechanism for enumerating the different messages. For example, assume two messages are sent to a PTL device: first message=Job 1, Green, Display 12345; second message=Job 2, Red, Display 34567. The PTL device may alternate the light Green then Red, indicating two tasks at this PTL device. A worker may pick parts from shelves with the Green light activated and the specific part number on the display. When the first worker activates the sensor, the master device may determine that pick was for Job 1 (instead of Job 2).

A fourth row 535 of the table 500 indicates that a fourth register 8702 is associated with the name "Light State." The description field of the fourth row 535 details that register 8702 may store data representing a state of an indicator light associated with the slave. For example, register 8702 may store a 16-bit value associated with different actuation states of the indicator light (e.g., off, on, flash1, flash2). In various examples, the register 8702 may be a register that stores general actuation states of a general actuator. For example, if an actuator were a speaker or acoustic device, then the register may store data indicating the volume of audible sound waves being generated by the speaker. In another example where an actuator is a haptic device, the actuation states may include an intensity of haptic feedback, or a pulse-width modulation (PWM) parameter of a haptic feedback control signal.

A fifth row 540 of the table 500 indicates that a fifth register 8703 is associated with the name "Light Color." The description field of the fifth row 540 details that register 8703 may store data representing a color of an indicator light associated with the slave. For example, register 8703 may store a 16-bit value associated with different color states of the indicator light (e.g., off, yellow, green, red). In various examples, the register 8703 may be a register that stores general actuation states of a general actuator. For example, if an actuator were a speaker or acoustic device, then the register may store data indicating the frequency of audible sound waves being generated by the speaker. In another example where an actuator is a haptic device, the actuation states may include a frequency of haptic feedback.

The sixth through tenth rows 545 of the table 500 indicates that registers 8704-8800 are associated with the name "Display." The description field of the sixth through tenth rows 545 details that register the associated registers may store data representing characters, which may be in ASCII format. For example, register 8704 may represent a starting address of ASCII display characters, while register 8800 may represent a last address of ASCII display characters. The Modbus register range 8704-8800 may, for example, provide a total of 97 registers (with 2 characters per register) for a total of 194 characters that can be output on a (LCD) display to indicate useful information to a worker or user, such as the job, SKU, and/or quantity.

Figure 6:
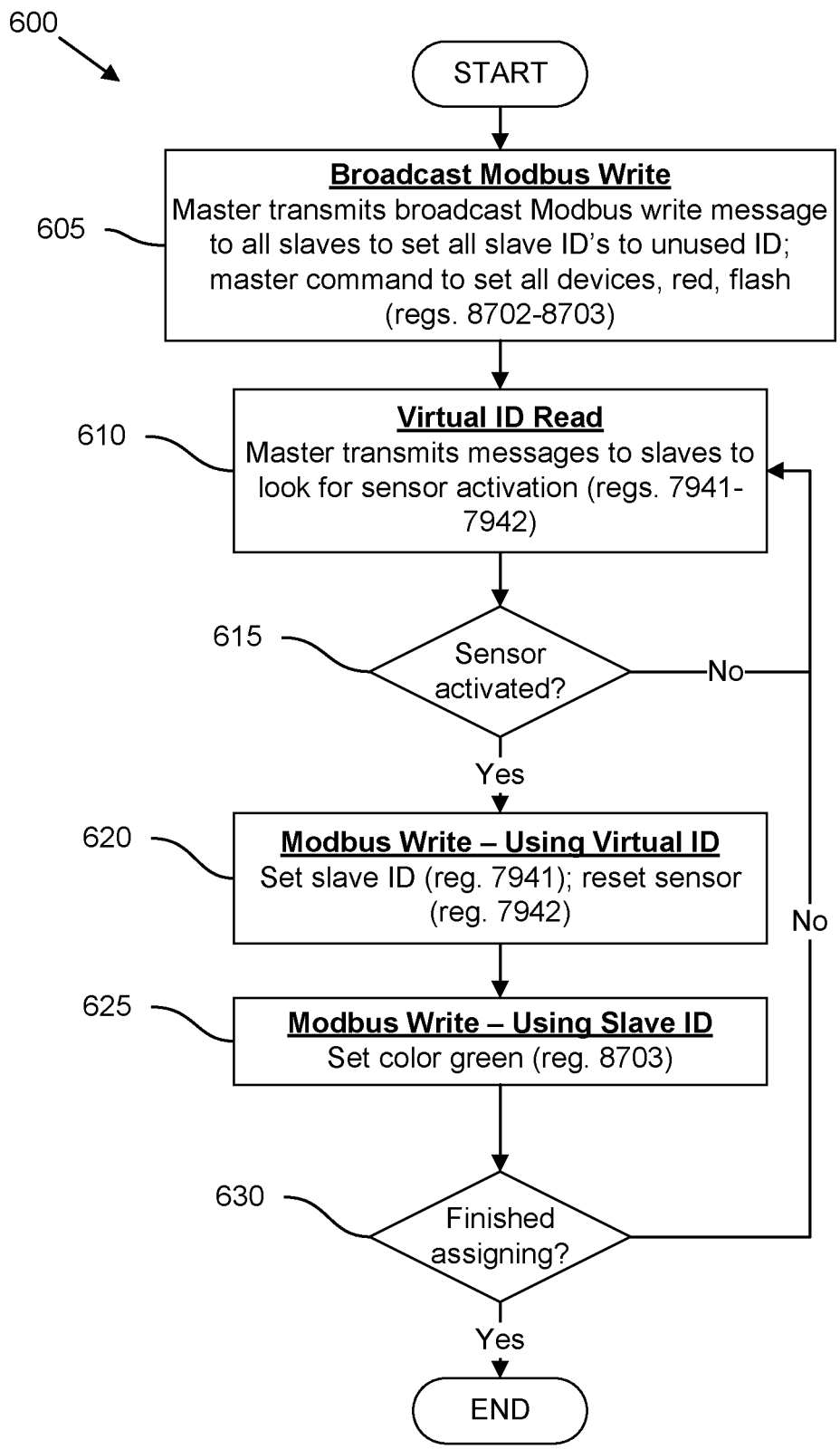
FIG. 6 depicts a flowchart of an exemplary address assignment process.

FIG. 6 depicts a flowchart of an exemplary address assignment process. An address assignment process 600 may be referred to herein as a "design-time" process. This design-time process may be used for assigning actual IDs for each PTL device. The virtual IDs may be separately assigned, for example, in the upper range of possible ID values (e.g., 195). The actual ID (standard Modbus ID) may be in the lower range (e.g., 1-100).

The steps of the process 600 may be executed by master in cooperation with individual slaves communicating over a Modbus network, for example. Operations for assigning the slave device addresses (IDs) may be performed for any Modbus network. In various implementations, a slave's ID may be constrained by a predetermined set or range of numbers input into the master device (e.g., a user may input 1-247 as the range of possible ID values). In an exemplary implementation, ID values for actual IDs may be on the low end of the ID range, while the virtual IDs may be chosen at the high end of the ID range, so as not to interfere with expanding a network with more slave devices. The slave ID assignment process 600 may, in some examples, be mostly automated by the Modbus master device. In various implementations, an error in process 600 may result in process 600 starting over (e.g., reinitializing to step 605).

Starting at step 605, the master transmits an address assignment broadcast message to slave devices on the network. The address assignment broadcast message may, for example, include a command to turn on slaves in the network to flashing red, indicating the assignment of slave IDs is in progress. The broadcast message may include a command to set all slave devices to an unused ID. Next, at step 610, the master begins polling, using a virtual ID, to look for sensor activation of slaves on the network. A user may select a first slave by activating a first sensor associated with the first slave (e.g., by the user touching the sensor with the user's hand, if the sensor input is a capacitive touch button). Next, at step 615, if the master does not receive a message from the first slave indicating that the first sensor input is activated, the master loops back to step 610, continuing to look on the network for sensor activation.

At step 615, if the master receives a message from the first slave indicating that the first sensor input is activated, then, at step 620, the master transmits a write message (using the virtual ID(s)) to write the first slave with the first (actual) ID in a predetermined list/range of IDs. At this point, the state of the first sensor may also be reset (e.g., by updating the relevant register in the first slave). Next, at step 625, the master may turn on a first output indicator associated with the first slave (e.g., by turning a light green) to indicate that the first slave has been programmed with the first (actual) ID. Next, at step 630, the master determines whether all slaves have been assigned. If not, the process loops back to step 610, continuing to look on the network for sensor activation. After transitioning from step 630 back to step 610, the system may continue to iterate through steps 610-630. For example, a user may activate a second sensor input associated with a second slave, which may be assigned a second/next (actual) ID in the predetermined list/range of IDs. The process 600 may continue to iterate through each ID in the predetermined list/range of IDs, until all the ID's in the predetermined range/list of IDs have been used. Accordingly, at step 630, once every slave device in the Modbus network is assigned an (actual) ID, the address assignment process 600 is complete, and the process 600 ends.

Figure 7:
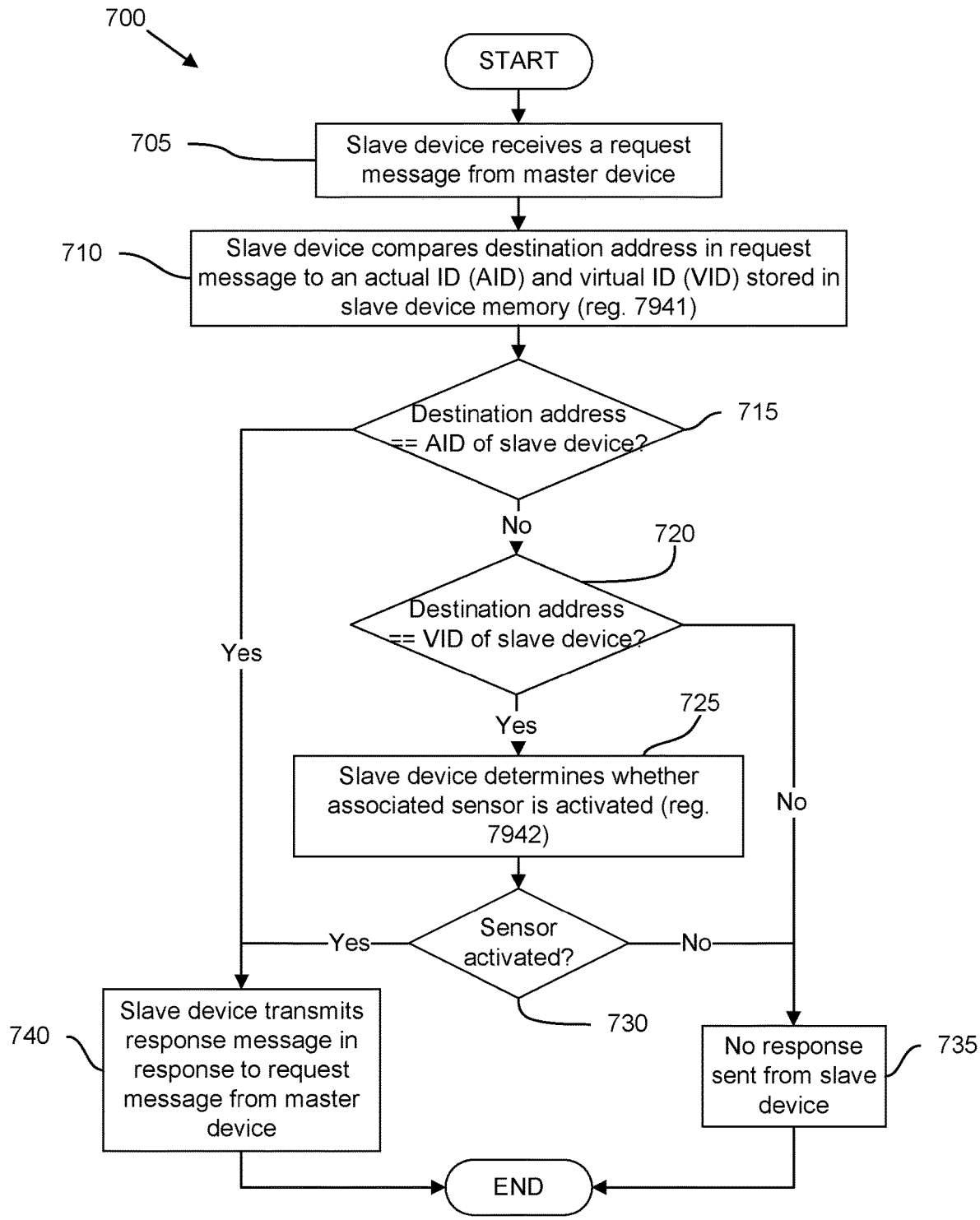
FIG. 7 depicts a flowchart of an exemplary slave response process.

FIG. 7 depicts a flowchart of an exemplary slave request/response process. A process 700 may be performed by a slave processor in accordance with slave instructions stored in an associated slave memory. Process 700 details sensor-activated response gating using virtual IDs (VIDs), which may beneficially expand the number of slave devices on the network while achieving low latency response times. A slave request/response process 700 may begin at step 705 with a given slave device receiving a request message from a master device. The request message may, for example, be a polling message sent from the master to multiple slaves. Next, at step 710, the slave compares the destination address in the received request message to an AID and/or VID stored in the memory of the slave device. The AID and/or VID may have been previously assigned to this slave using, for example, the address assignment process 600 detailed in FIG. 6. At step 715, if the destination address does not match the AID of the slave device, then the process continues to step 720. If at step 715, the destination address matches the AID of the slave device, then the slave device transmits a response message in response to the request message previously sent by the master at step 740.

At step 720, if the destination address does not match the VID of the slave device, then no response is sent from the slave device back to the master device at step 735. If, at step 720, the destination address matches the VID of the slave device, then slave device will determine whether a sensor input associated with the slave device is in an active state at step 730. If, at step 730, the sensor input is not in an active state, then no response is sent from the slave device back to the master device at step 735. If, at step 730, the sensor input is in an active state, then the slave device transmits a response message in response to the request message previously sent by the master at step 740. The response message transmitted from the slave may be responsive of a particular instruction or command sent from the master and contained within the request message. For example, the tables below shows an exemplary Modbus communication:

| Master Request | Data (hex) |
| --- | --- |
| Slave Address (ID) | C3 |
| Function Code | 3 |
| Data Address Hi | 1F |
| Data Address Low | 5 |
| Number of Regs Hi | 0 |
| Number of Regs Low | 2 |
| CRC Hi | xx |
| CRC Low | xx |

| Slave Response | Data (hex) |
| --- | --- |
| Slave Address (ID) | C3 |
| Function Code | 3 |
| Byte Count | 4 |
| Data N Hi | 0 |
| Data N Low | A |
| Data N + 1 Hi | 0 |
| Data N + 1 Low | 1 |
| CRC Hi | xx |

In the Modbus communication shown above, the master sends a read request to the slave network to (virtual) slave address 195 (0xC3 in hexadecimal). The request is to read two registers at address 7941. If no sensor in the network is activated, there will be no response and the master will end up with a timeout condition. If a sensor on a slave device has been activated, the slave will send the response. The registers requested contain the actual ID (AID) of the device and the sensor value (1). With this information the master will know the specific slave with the activated sensor and can interrogate further if needed. The example above shows slave 0xA responds to the message to the virtual ID and the sensor value is '1'.

Figure 8:
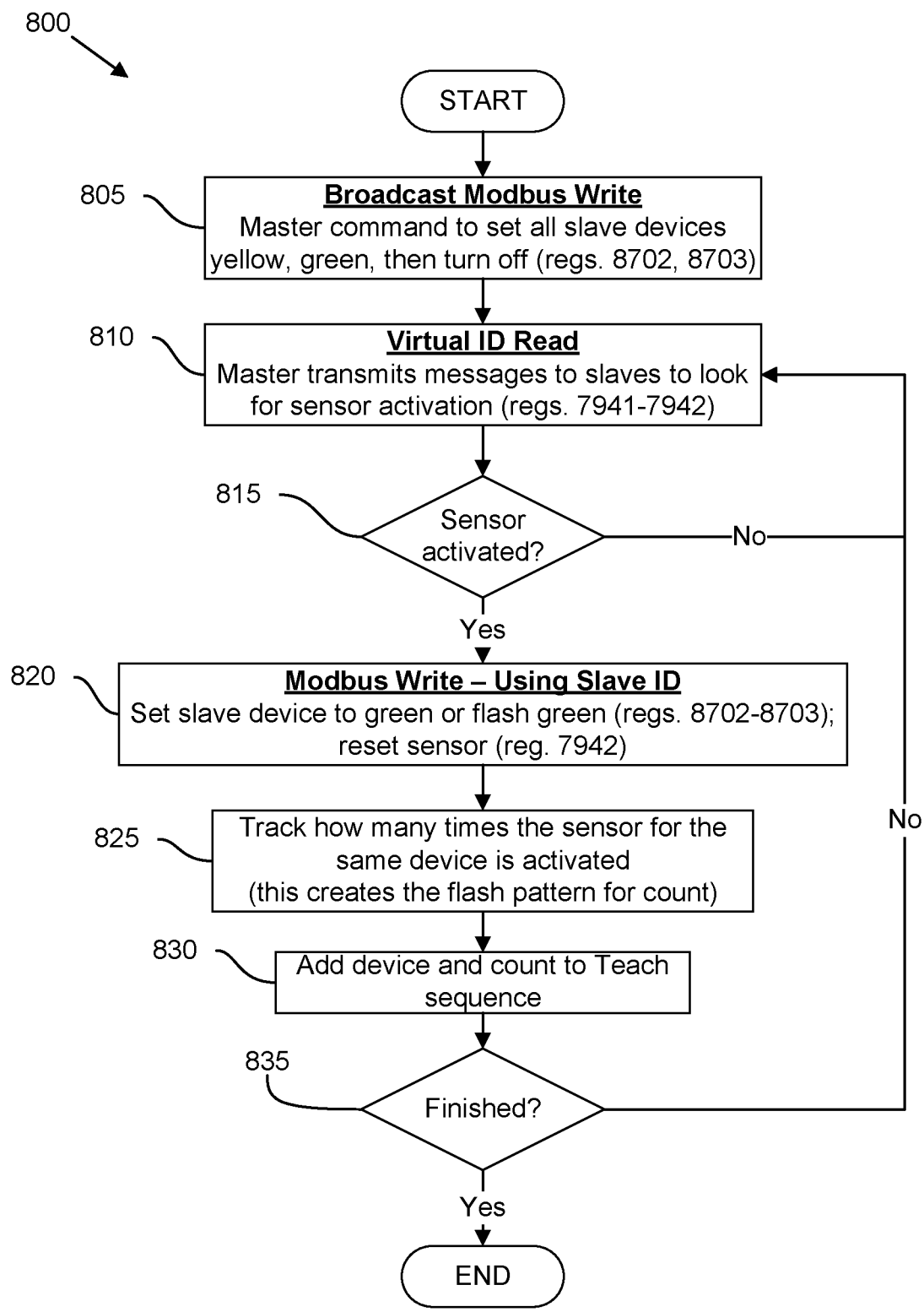
FIG. 8 depicts a flowchart of an exemplary teach mode process.

FIG. 8 depicts a flowchart of an exemplary teach mode process. A teach mode may allow a user to create a pick list by activating sensors of the slave devices required for the specific application. A count may be associated with each pick by activating the sensor on the same device multiple times. Multiple lists can be saved and can be recalled as needed, in some embodiments. The list may be used to create a sequential pick sequence or a batch pick depending upon the required application, for example.

FIG. 8 depicts a flowchart of an exemplary teach mode process. A teach mode may allow a user to create a pick list by activating sensors of the slave device required for the specific application. A count may be associated with each pick by activating the sensor on the same device multiple times. Multiple lists can be saved and can be recalled as needed, in some embodiments. The list may be used to create a sequential pick sequence or a batch pick, depending upon the required application.

A teach mode process 800 begins at step 805 with a broadcast message that writes to all slave devices. The broadcast message may, for example, contain an order for each slave device to turn on actuator/light outputs to yellow, then green, then off. The yellow-green-off pattern may indicate that teach mode has started. Next, at step 810, the master polls slave devices using a virtual ID address, to look for any sensor activation. At step 815, if there is no sensor activation detected, then the process repeats through steps 810 and 815. At step 815, once a sensor activation is detected, then at step 820, the slave device ID associated with the activated sensor is placed on a teach list. Placing a given slave device on the teach list may be visually indicated to a user by the slave device actuator output turning green or flashing green, for example. In some embodiments, the sensor input may also be reset (e.g., from 1 to 0).

Next, at step 825, the master device keeps track of how many times the sensor is activated on the same device. In some examples, the slave may change the light output to flash the number of times the sensor is activated. Next, at step 830, the master may save the sequence and count to non-volatile storage. Next, at step 835, if the process is not complete, then the process will loop back to step 810. At step 835, if the process is complete, then the process ends. In various examples, each list that is saved may have a unique numerical identifier (so multiple lists can be saved).

Figure 9:
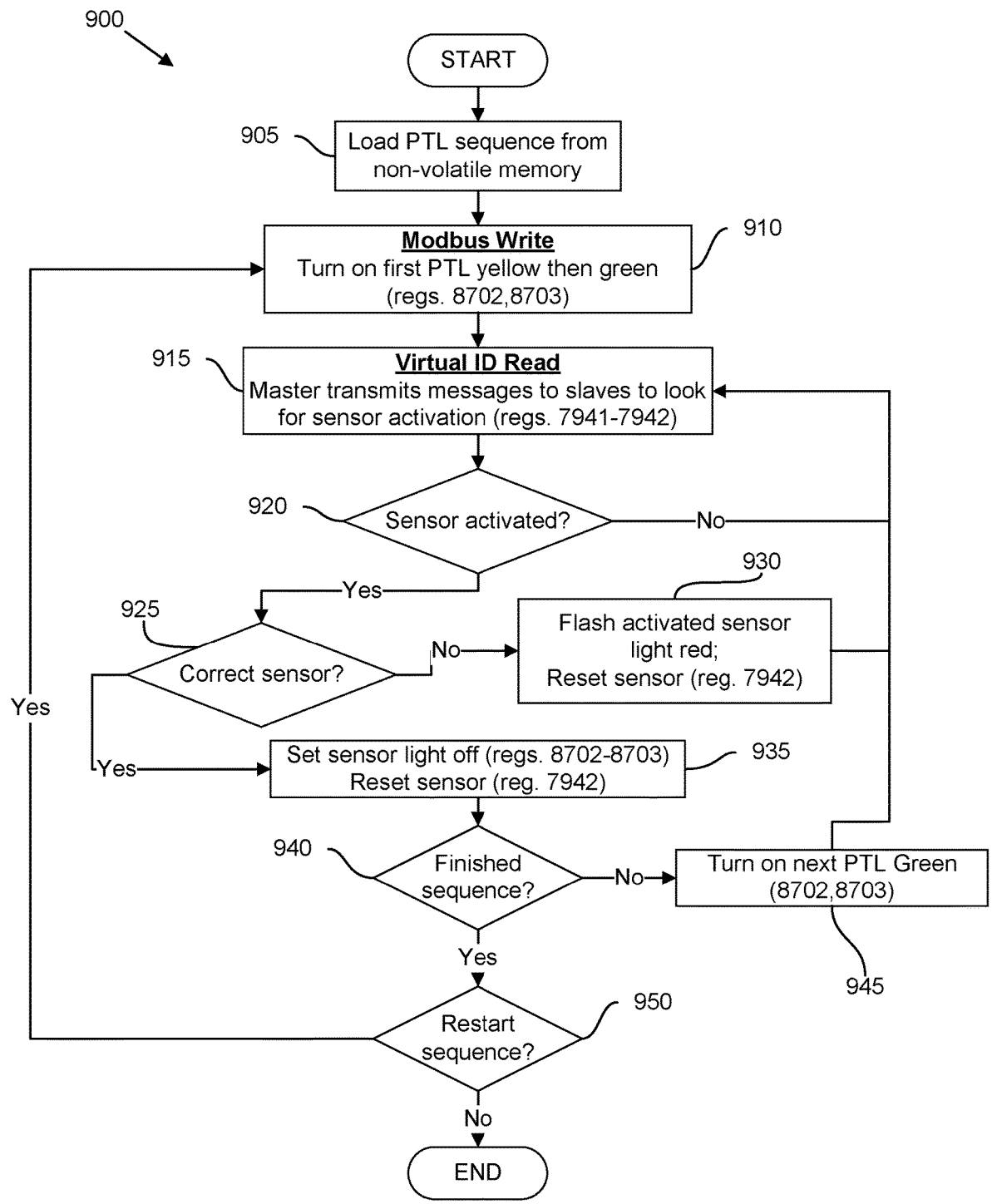
FIG. 9 depicts a flowchart of an exemplary pick to light (PTL) sequential pick process.

FIG. 9 depicts a flowchart of an exemplary pick to light (PTL) sequential pick process. In a PTL sequential pick operation, a pick sequence that is saved during teach mode may be loaded to perform a pick sequence. The information saved after a teach operation may be the Slave ID and a count (e.g., per process 900 in FIG. 9). In a first step 905, the master will load a previously saved PTL sequence from memory. Next, at step 910, the first device in the PTL sequence is turned on yellow then green to indicate the first device in the sequence, for example. At step 915, the master then sends a read request to the virtual ID looking for any slave that has the sensor activated. If no slave sensor has been activated at step 920, step 915 is repeated. If a slave sensor activation is detected at step 920, but is not the expected slave, the output light is flashed red indicating the slave sensor activated was incorrect at step 930. When a slave sensor is activated and it is the expected slave (meaning the answers to steps 920 and 925 are both "Yes"), the slave light is turned off and the sensor is cleared at step 935. If the sequence is not finished at step 940, the master will activate the light on the next slave on the pick list at step 945. The device's outputs are turned off and activates the next device in the sequence. When the end of the sequence is detected, the sequence may be restarted at step 950.

Figure 10:
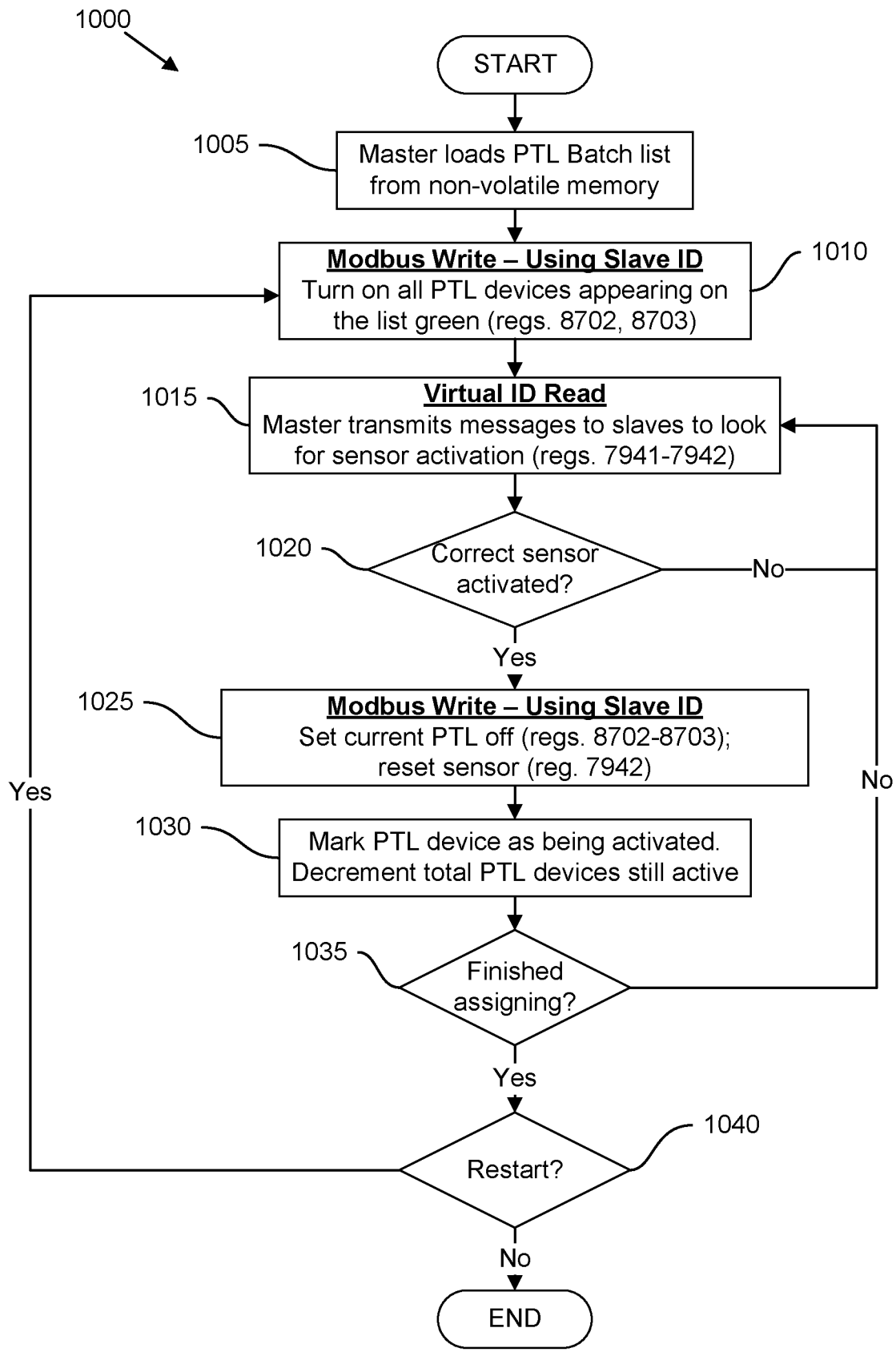
FIG. 10 depicts a flowchart of an exemplary batch operation process.

FIG. 10 depicts a flowchart of an exemplary batch operation process. In various examples, the batch operation may be substantially similar to the sequential pick operations 900 shown in FIG. 9, except that all slave devices on the list may be activated at the start of the operation. As a sensor on a device is activated, it is turned off, in some embodiments. In various implementations, once all the lights have been turned off, the operation is finished. In some examples, each sensor activated must be on the list. In various embodiments, the entire list must have been activated at some point before the operation is complete.

Figure 11:
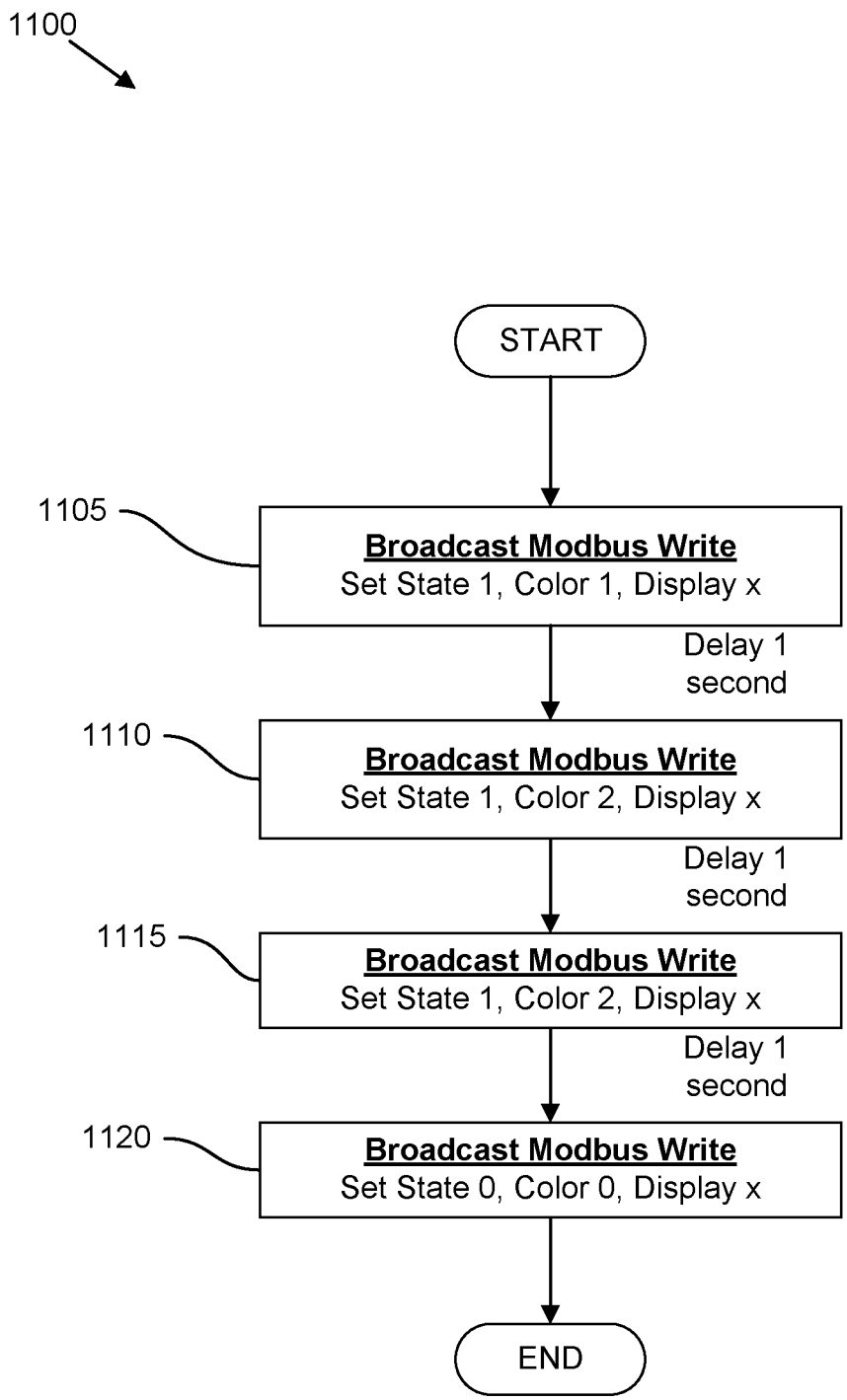
FIG. 11 depicts a flowchart of an exemplary test mode process.

FIG. 11 depicts a flowchart of an exemplary test mode process. Test mode is a set of operations the master device will execute to cycle each slave device through a set of colors. This verifies simple operation and communications with the PTL sensors. The test mode may be performed before any of the processes 600-1000. The master may not receive any data from the PTL devices, in some examples. In various implementations, verification may require visual inspection by the user to make sure the lights being activated.

Although various embodiments have been described with reference to the Figures, other embodiments are possible. For example, a standard Modbus protocol structure may not offer the performance required to operate a pick-to-light (PTL) system with low latency response times. In various embodiments, adding more and more end devices on a PTL system running standard Modbus protocol may eventually make a PTL system unusable, because of the request/response nature of the protocol. Accordingly, by adjusting the slave devices' Modbus software/firmware, a Modbus master controller may still run the standard Modbus protocol, while the adjusted Modbus system is capable of achieving the performance requirements of a PTL system.

In various examples, a networked system may include multiple slave devices. Each slave device may include a slave processor. Each slave device may include a sensor interface operably coupled to the slave processor and to a sensor device. The sensor device may include a sensor input. Each slave device may include a slave network interface operably coupled to the slave processor and configured to operably couple to a master device over a network. Each slave device may include a non-transitory slave computer-readable medium operably coupled to the slave processor and storing data. The stored data may include a unique slave address. The stored data may include a non-unique slave address. The stored data may include a slave device state. The slave device state may be either an active state or an idle state, where the active state may be associated with an activated sensor input of the sensor device, in some examples. In various examples, a given non-transitory slave computer-readable medium may store a program of instructions that, when executed by an associated slave processor, causes the associated slave processor to perform slave operations. Slave operations, in some implementations, may include: in response to receiving, over the network, a request signal from the master device directed to a specific non-unique slave address, transmitting a response signal to the master device over the network, if: (1) the specific non-unique slave address matches the non-unique slave address stored in the given non-transitory slave computer-readable medium, and (2) the slave device state stored in the given non-transitory slave computer-readable medium is in the active state when the request signal is received at the slave device.

In various examples, the at least one sensor input may be an optical sensor input, a capacitive touch sensor input, or a push button sensor input. In some implementation, each sensor device may further include an output indicator. The output indicator may, for example, be a visual output indicator, an audible output indicator, or a haptic output indicator. In some implementations, the response signals of each slave device may be gated by the slave device state being in the active state. In some embodiments, each slave response signal may be an indication of the slave device state of the associated slave device, an indication of the unique slave address, an indication for the master to take action, or an indication to receive a new request from the master. In some examples, each non-transitory slave computer-readable medium of a first set of slave devices in the multiple slave devices may store a first non-unique slave address, while each non-transitory slave computer-readable medium of a second set of slave devices in the multiple slave devices may store a second non-unique slave address different from the first non-unique slave address. The first set of slave devices and the second set of slave devices may be mutually exclusive, in various implementations.

In some embodiments, each of the non-transitory slave computer-readable mediums may store a respective response time offset parameter greater than or equal to zero, such that a given slave device in the plurality of slave devices is configured to respond to the request signal after a predetermined amount of time has passed after the slave receives the request signal, the predetermined amount of time being equal to the response time offset parameter stored in the non-transitory slave computer-readable medium of the given slave device. A first response time offset parameter stored in a first non-transitory slave computer-readable medium may be different from a second response time offset parameter stored in a second non-transitory slave computer-readable medium, in some implementations.

A networked system may include, for example, a master device. The master device may include a master processor. The master device may include a non-transitory master computer-readable medium operably coupled with the master processor. The master device may include a master network interface operably coupled to the master processor. A networked system may further include a network operably coupled to each of the slave network interfaces and the master network interface, to operably couple the master device to each slave device in the multiple slave devices. In various examples, the non-transitory master computer-readable medium may store a program of instructions that, when executed by the master processor, cause the master processor to perform master operations to communicate with the plurality of slave devices over the network. The master operations may include, in some examples, transmitting, over the network, a request signal addressed to a specific non-unique slave address. In some implementations, the non-transitory master computer-readable medium may store a predetermined timeout parameter. In various examples, the master operations may further include: retransmitting the request signal if a difference in time between a transmit time of the request signal from the master device and a reception time of the response signal at the master device is greater than the predetermined timeout parameter. The predetermined timeout parameter may be at least 10 milliseconds, in some embodiments. The network may be a Modbus protocol network, for example. The network may be a daisy-chain network, such that each slave device in the plurality of slave devices is configured in series with another slave device in the plurality of slave devices, for example. The non-transitory master computer-readable medium may, in various implementations, store a mapping table that associates each slave device with the slave device's corresponding unique slave address and non-unique slave address.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a slave.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A networked system comprising:
   a plurality of slave devices each comprising:
      a slave processor;
      a sensor interface operably coupled to the slave processor and to a sensor device comprising a sensor input;
      a slave network interface operably coupled to the slave processor and configured to operably couple to a master device over a network; and,
      a non-transitory slave computer-readable medium operably coupled to the slave processor and storing data comprising:
         a unique slave address;
         a non-unique slave address; and,
         a slave device state comprising at least one of an active state and an idle state, the active state being associated with an activated sensor input of the sensor device,
   wherein a given non-transitory slave computer-readable medium stores a program of instructions that, when executed by an associated slave processor, causes the associated slave processor to perform slave operations comprising:
      in response to receiving, over the network, a request signal from the master device directed to a specific non-unique slave address, transmitting a response signal to the master device over the network, if: (1) the specific non-unique slave address matches the non-unique slave address stored in the given non-transitory slave computer-readable medium, and (2) the slave device state stored in the given non-transitory slave computer-readable medium is in the active state when the request signal is received at the slave device.

2. The networked system of claim 1, wherein at least one sensor input is selected from the group consisting of an optical sensor input, a capacitive touch sensor input, and a push button sensor input.

3. The networked system of claim 1, wherein each sensor device further comprises an output indicator.

4. The networked system of claim 3, wherein at least one output indicator is selected from the group consisting of a visual output indicator, an audible output indicator, and a haptic output indicator.

5. The networked system of claim 1, wherein each slave response signal is selected from the group consisting of an indication of the slave device state of the associated slave device, an indication of the unique slave address, an indication for the master to take action, and an indication to receive a new request from the master.

6. The networked system of claim 1, wherein:
   each non-transitory slave computer-readable medium of a first plurality of slave devices in the plurality of slave devices store a first non-unique slave address,
   each non-transitory slave computer-readable medium of a second plurality of slave devices in the plurality of slave devices store a second non-unique slave address different from the first non-unique slave address, and the first plurality of slave devices and the second plurality of slave devices are mutually exclusive.

7. The networked system of claim 1, wherein each of the non-transitory slave computer-readable mediums store a respective response time offset parameter greater than or equal to zero, such that a given slave device in the plurality of slave devices is configured to respond to the request signal after a predetermined amount of time has passed after the slave receives the request signal, the predetermined amount of time being equal to the response time offset parameter stored in the non-transitory slave computer-readable medium of the given slave device.

8. The networked system of claim 7, wherein a first response time offset parameter stored in a first non-transitory slave computer-readable medium is different from a second response time offset parameter stored in a second non-transitory slave computer-readable medium.

9. A networked system comprising:
a plurality of slave devices each comprising:
a slave processor;
a sensor interface operably coupled to the slave processor and to a sensor device;
a slave network interface operably coupled to the slave processor and configured to operably couple to a master device over a network; and,
a non-transitory slave computer-readable medium operably coupled to the slave processor and storing data comprising:
a unique slave address;
a non-unique slave address; and,
a slave device state comprising at least one of an active state and an idle state,
wherein a given non-transitory slave computer-readable medium stores a program of instructions that, when executed by an associated slave processor, causes the associated slave processor to perform slave operations comprising:
in response to receiving, over the network, a request signal from the master device directed to a specific non-unique slave address, transmitting a response signal to the master device over the network, if: (1) the specific non-unique slave address matches the non-unique slave address stored in the given non-transitory slave computer-readable medium, and (2) the slave device state stored in the given non-transitory slave computer-readable medium is in the active state when the request signal is received at the slave device.

10. The networked system of claim 9, wherein each sensor device comprises a sensor input and an output indicator.

11. The networked system of claim 10, wherein at least one sensor input is selected from the group consisting of an optical sensor input, a capacitive touch sensor input, and a push button sensor input.

12. The networked system of claim 10, wherein at least one output indicator is selected from the group consisting of a visual output indicator, an audible output indicator, and a haptic output indicator.

13. The networked system of claim 9, wherein:
each non-transitory slave computer-readable medium of a first plurality of slave devices in the plurality of slave devices store a first non-unique slave address,
each non-transitory slave computer-readable medium of a second plurality of slave devices in the plurality of slave devices store a second non-unique slave address different from the first non-unique slave address, and the first plurality of slave devices and the second plurality of slave devices are mutually exclusive.

14. The networked system of claim 9, wherein each of the non-transitory slave computer-readable mediums store a respective response time offset parameter greater than or equal to zero, such that a given slave device in the plurality of slave devices is configured to respond to the request signal after a predetermined amount of time has passed after the slave receives the request signal, the predetermined amount of time being equal to the response time offset parameter stored in the non-transitory slave computer-readable medium of the given slave device.

15. The networked system of claim 14, wherein a first response time offset parameter stored in a first non-transitory slave computer-readable medium is different from a second response time offset parameter stored in a second non-transitory slave computer-readable medium.

16. A networked system comprising:
a plurality of slave devices each comprising:
a slave processor;
a sensor interface operably coupled to the slave processor and to a sensor device;
a slave network interface operably coupled to the slave processor; and,
a non-transitory slave computer-readable medium operably coupled to the slave processor and storing data comprising:
a unique slave address;
a non-unique slave address; and,
a slave device state comprising at least one of an active state and an idle state;
a master device comprising:
a master processor;
a non-transitory master computer-readable medium operably coupled with the master processor; and,
a master network interface operably coupled to the master processor; and,
a network operably coupled to each of the slave network interfaces and the master network interface, to operably couple the master device to each slave device in the plurality of slave devices,
wherein the non-transitory master computer-readable medium stores a program of instructions that, when executed by the master processor, cause the master processor to perform master operations to communicate with the plurality of slave devices over the network, the master operations comprising:
transmitting, over the network, a request signal addressed to a specific non-unique slave address,
wherein a given non-transitory slave computer-readable medium stores a program of instructions that, when executed by an associated slave processor, causes the associated slave processor to perform slave operations comprising:
in response to receiving, over the network, the request signal from the master device directed to the specific non-unique slave address, transmitting a response signal to the master device over the network, if: (1) the specific non-unique slave address matches the non-unique slave address stored in the given non-transitory slave computer-readable medium, and (2) the slave device state stored in the given non-transitory slave computer-readable medium is in the active state when the request signal is received at the slave device.

17. The networked system of claim 16, wherein:
the non-transitory master computer-readable medium stores a predetermined timeout parameter, and,
the master operations further comprise:
retransmitting the request signal if a difference in time between a transmit time of the request signal from the master device and a reception time of the response signal at the master device is greater than the predetermined timeout parameter.

18. The networked system of claim 17, wherein the predetermined timeout parameter is at least 10 ms.

19. The networked system of claim 16, wherein the network comprises a Modbus protocol network.

20. The networked system of claim 16, wherein the network comprises a daisy-chain network, such that each slave device in the plurality of slave devices is configured in series with another slave device in the plurality of slave devices.

21. The networked system of claim 16, wherein the non-transitory master computer-readable medium stores a mapping table that associates each slave device with the slave device's corresponding unique slave address and non-unique slave address.

22. The networked system of claim 16, wherein each sensor device comprises a sensor input and an output indicator.

23. The networked system of claim 22, wherein at least one sensor input is selected from the group consisting of an optical sensor input, a capacitive touch sensor input, and a push button sensor input.

24. The networked system of claim 22, wherein at least one output indicator is selected from the group consisting of a visual output indicator, an audible output indicator, and a haptic output indicator.

25. The networked system of claim 16, wherein each slave response signal is selected from the group consisting of an indication of the slave device state of the associated slave device, an indication of the unique slave address, an indication for the master to take action, and an indication to receive a new request from the master.

26. The networked system of claim 16, wherein each of the non-transitory slave computer-readable mediums store a respective response time offset parameter greater than or equal to zero, such that a given slave device in the plurality of slave devices is configured to respond to the request signal after a predetermined amount of time has passed after the slave receives the request signal, the predetermined amount of time being equal to the response time offset parameter stored in the non-transitory slave computer-readable medium of the given slave device.

27. The networked system of claim 26, wherein a first response time offset parameter stored in a first non-transitory slave computer-readable medium is different from a second response time offset parameter stored in a second non-transitory slave computer-readable medium.

* * * * *